United States Patent
Mitsui et al.

(10) Patent No.: US 8,374,337 B2
(45) Date of Patent: Feb. 12, 2013

(54) SLIDE UNIT MECHANISM

(75) Inventors: Yasuhiro Mitsui, Ichihara (JP); Yoshinori Shimomura, Higashihiroshima (JP)

(73) Assignees: Mitsubishi Steel MFG. Co., Ltd., Tokyo (JP); Sharp Kabushiki Kaisha, Osaka-shi, Osaka (JP)

( * ) Notice: Subject to any disclaimer, the term of this patent is extended or adjusted under 35 U.S.C. 154(b) by 69 days.

(21) Appl. No.: 12/998,989

(22) PCT Filed: Jan. 19, 2010

(86) PCT No.: PCT/JP2010/050567
§ 371 (c)(1),
(2), (4) Date: Jun. 21, 2011

(87) PCT Pub. No.: WO2010/084859
PCT Pub. Date: Jul. 29, 2010

(65) Prior Publication Data
US 2011/0252603 A1 Oct. 20, 2011

(30) Foreign Application Priority Data

Jan. 21, 2009 (JP) .................................. 2009-010821

(51) Int. Cl.
*H04M 1/00* (2006.01)
*H04M 9/00* (2006.01)
(52) U.S. Cl. ................................. 379/433.12; 455/575.4
(58) Field of Classification Search ............. 379/433.11, 379/433.12; 455/575.1, 575.4, 550.1, 90.3; 361/727
See application file for complete search history.

(56) References Cited

U.S. PATENT DOCUMENTS

| | | | | |
|---|---|---|---|---|
| 7,574,243 | B2 * | 8/2009 | Lee ............................. | 455/575.4 |
| 2007/0032278 | A1 * | 2/2007 | Lee et al. .................... | 455/575.4 |
| 2009/0267472 | A1 * | 10/2009 | Chen et al. ................. | 312/351.1 |

(Continued)

FOREIGN PATENT DOCUMENTS

| | | |
|---|---|---|
| JP | 2004-253526 | 9/2004 |
| JP | 2005-210649 | 8/2005 |

(Continued)

*Primary Examiner* — Tuan D Nguyen
(74) *Attorney, Agent, or Firm* — Flynn, Thiel, Boutell & Tanis, P.C.

(57) ABSTRACT

The present invention relates to a thin slide mechanism that can be incorporated in a portable electronic device. A slide unit mechanism having: a plate 1 of a quadrangular shape in a plane view in which a protruding portion A is formed in a sliding direction in the center of the rear surface and receding portions B are formed in two locations respectively to the left and to the right of the protruding portion; two sliding members 2 slidably joined to both ends of the plate; and a linking member 22 that integrally links the two sliding members on the front surface side of the plate and has a width substantially equal to or less than a longitudinal width of the sliding member in the sliding direction, wherein the entire portion or a part of the rear surface portion of the folded sliding member, when folded to the rear surface, is extended to serve as stopper portions 3, a torsion spring is arranged in each of the left and right receding portions of the plate, one end of each torsion spring is locked to the substantially central portion, in the sliding direction, of the side surface of the protruding portion formed on the plate, the other end of each torsion spring is locked to the stopper portions of the sliding members, connection members for connection to a housing are formed at the approximately four corners of the plate, and sliding ends are formed when the connection members and the stopper portions of the sliding members abut on each other.

5 Claims, 4 Drawing Sheets

FOREIGN PATENT DOCUMENTS

Figure 1:
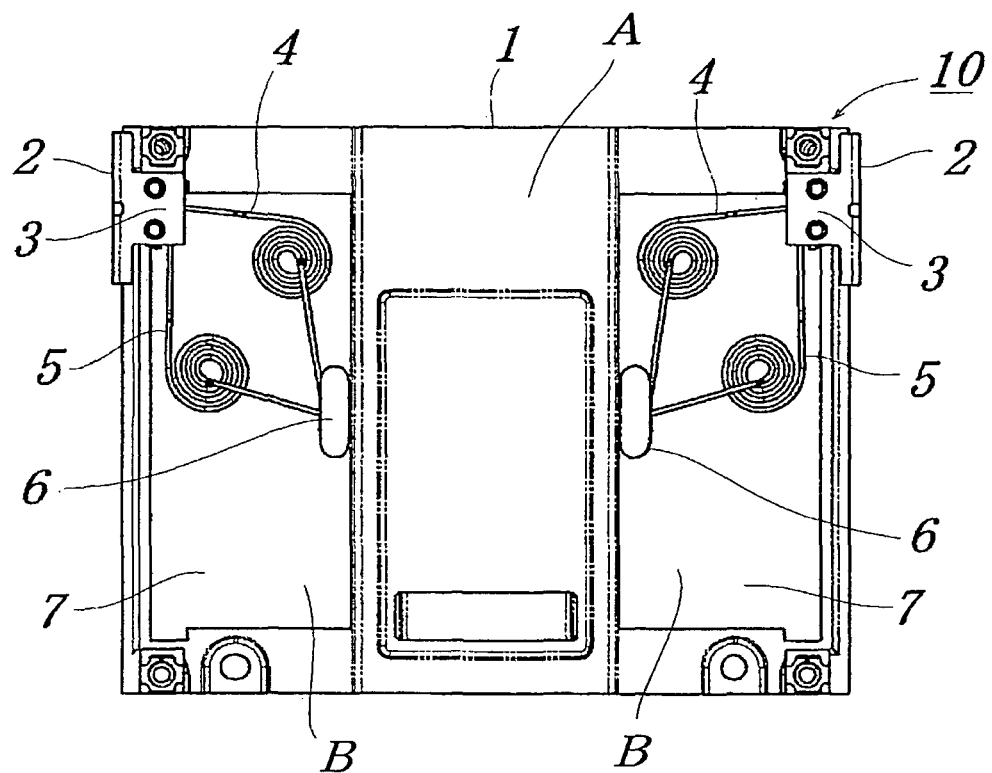

| | | |
|---|---|---|
| JP | 2005-295024 | 10/2005 |
| JP | 2007-224963 | 9/2007 |
| JP | 2007-267238 | 10/2007 |
| JP | 2008-502175 | 1/2008 |

\* cited by examiner

SLIDE UNIT MECHANISM

BACKGROUND OF THE INVENTION

1. Field of the Invention

The present invention relates to a thin slide mechanism that can be incorporated in a portable electronic device such as a cellular phone, a PHS, and a PDA, and more particularly to a slide unit mechanism having high durability and reduced surface area of the internal slide structure that can be viewed from the outside.

2. Description of the Related Art

The so-called slide-type portable electronic device in which a main body portion and a monitor portion are divided into two layers of an upper layer portion and a lower layer portion and an operation portion located on the inner side of the lower layer portion is exposed by sliding the upper layer portion are presently well known.

In the conventional slide-type portable electronic device, a slide device is used in which one end of a torsion spring is fixedly attached to a first housing serving as the monitor portion and the other end is fixedly attached to a second housing serving as the main body portion and which is operated by using an elastic pressure of the torsion spring.

For example, Japanese Patent Publication No. 2004-253526 discloses a structure that has a first member and a second member and in which sliding movement is induced by inserting an engagement portion into a guide hole. In this structure, one end of a torsion spring is fixed to the engagement portion and the other end is fixed to the housing.

Further, Japanese Patent Publication No. 2007-224963 discloses a structure that includes a movable frame that is joined to both ends of a metallic plate and in which one end of a torsion spring is fixed to the inner side of the joining portion of the plate and the other end is fixed to the frame. International Patent Publication No. 2008-502175 discloses a structure that includes a frame movable on guide bars provided at both sides in the longitudinal direction and in which one end of a torsion spring is fixed to the frame and the other end is fixed to the frame on the inner side of the guide bars.

When a torsion spring is used in such portable electronic devices, a predetermined length is necessary in the sliding direction. Thus, when a housing is opened and closed by using a torsion spring, one end of the torsion spring should be fixedly attached close to the center of the slide length in order to generate a uniform spring force. For example, in the slide device described in Japanese Patent Publication No. 2007-224963, one end of each of two torsion springs is fixedly attached substantially close to the center of the housing. Therefore, a plate of a predetermined width is necessary to hide the internal slide structure where the torsion spring or the like is disposed.

Because a predetermined spring force is necessary to cause such device to slide, a specific limitation is placed on the possible reduction of the torsion spring in size. Therefore, it is necessary to provide a plate for hiding about half of the slide length.

Furthermore, because of a recent spread of oneseg portable devices, portable electronic devices has also been developed in which a horizontally long monitor is disposed at the housing and caused to slide in the widthwise direction. For example, Japanese Patent Publication No. 2007-267238 discloses a portable device in which sliding is induced in the widthwise direction.

Torsion springs are also used in such portable electronic devices in which sliding is induced in the widthwise direction. However, because the predetermined spring force is required, the arrangement zone of the torsion springs sometimes occupies more than half of the slide length, and therefore it is necessary to provide a plate having a large enough surface area to hide the slide. For this reason, a slide length is restricted so that the plate could not be seen from the outside of the portable device. As a result, the surface area of the lower layer portion (operation portion) that is exposed when the upper layer portion (monitor portion) is caused to slide is smaller. Therefore, the size and arrangement of operation buttons are restricted.

Further, in the conventional slide device using spirally wound springs or torsion spring, the width of the slide device is increased. As a result, possible arrangements of antenna in the monitor portion are limited in the portable electronic devices in which sliding is induced in the widthwise direction.

Further, when a spirally wound spring or a torsion spring of a conventional size is used, a predetermined space is necessary for separation between the diametrical direction of the spring and the plate that will be locked. Consequently, this space acts as a technical barrier to thickness reduction in portable electronic devices incorporating a slide unit.

SUMMARY OF THE INVENTION

It is an object of the present invention to provide a thin slide mechanism that is to be incorporated in a portable electronic device and has sufficient spring force and high durability and also to provide a slide unit mechanism in which the internal slide structure viewable from the outside is reduced in size.

The present invention employs the following features to resolve the abovementioned problems.

(1) A slide unit mechanism having: a plate of a quadrangular shape in a plane view in which a protruding portion is formed in a sliding direction in the center of the rear surface and receding portions are formed in two locations respectively to the left and to the right of the protruding portion; two sliding members slidably joined to both ends of the plate; and a linking member that integrally links the two sliding members on the front surface side of the plate and has a width substantially equal to or less than a longitudinal width of the sliding member in the sliding direction, wherein the entire portion or a part of the rear surface portion of the folded sliding member, when folded to the rear surface, is extended to serve as stopper portions, a torsion spring is arranged in each of the left and right receding portions of the plate, one end of each torsion spring is locked to the substantially central portion, in the sliding direction, of the side surface of the protruding portion formed on the plate, the other end of each torsion spring is locked to the stopper portions of the sliding members, connection members for connection to a housing are formed at the approximately four corners of the plate, and sliding ends are formed when the connection members and the stopper portions of the sliding members abut on each other.

(2) The slide unit mechanism according to (1) above, wherein the torsion springs are disposed by two opposite each other in each receding portion.

(3) The slide unit mechanism according to (1) or (2) above, wherein at least the joining portions of the sliding members that abut on the plate are formed from a resin.

(4) The slide unit mechanism according to any of (1) to (3) above, wherein the stopper portions are obtained by extending only the center of the folded portions of the sliding members.

(5) The slide unit mechanism according to any of (1) to (4) above, wherein the slide unit mechanism can be reduced in thickness by using the torsion springs formed in a flat spiral shape.

When the slide unit mechanism in accordance with the present invention is incorporated in a portable electronic device, the surface area of the internal slide structure that is visible from the outside can be reduced, the surface area of the operation portion of the main body section can be increased over that of the conventional product, and the degree of freedom in designing the position and dimensions of the operation buttons is therefore increased. As a result, the operability is increased over that of the conventional product.

Further, by forming the torsion springs in a flat spring shape, it is possible to reduce further the thickness of the slide unit mechanism.

It is also possible to provide a thin portable electronic device by incorporating the slide unit mechanism in which the plate is disposed at the first housing and the linking member is fixedly attached to the second housing, so that the sliding direction is in the transverse direction of the portable electronic device.

DETAILED DESCRIPTION OF THE PREFERRED EMBODIMENTS

The plate with a quadrangular shape in the plan view that is used in accordance with the present invention has a protruding portion formed in the sliding direction in the center of the rear surface. This is done to provide a receding portion for disposing harness wiring or the like at the front surface.

Two sliding members are joined to both ends of the plate. These two sliding members are integrally linked by a linking member at the front surface side of the plate. In this configuration, the linking member is formed to a width substantially equal to or less than a longitudinal width of the sliding member in the sliding direction.

The plate, sliding members, and linking member may be formed using any material, but are generally preferred to be formed from stainless steel, aluminum, a resin, or the like.

The sliding members are folded to the rear surface side from the linking member disposed on the front surface of the plate, and the folded sliding members are slidably joined to both ends of the plate.

The entire portion of each sliding member folded to the rear surface side or part thereof is extended and has a stopper portion that abuts on the connection portion serving for connection with the below-described housing.

The mechanism causing the slide unit to slide in accordance with the present invention will be described below. Torsion springs are disposed in each of the left and right receding portions of the plate. One end of each torsion spring is rotatably locked to a substantially central portion, in the sliding direction, of the side surface of the protruding portion formed in the sliding direction in the center of the plate.

The other end of each torsion spring is rotatably locked to the stopper portion of the sliding member. This locking to the stopper portion can be performed by disposing a support rod on the rear surface of the sliding member and winding the end portion to the torsion spring about the support rod. It goes without saying that another structure may be used in the present invention.

The material of the torsion springs used in accordance with the present invention is not particularly limited, provided that the material is advantageous as a spring steel. For example, stainless steel and a piano wire can be used.

Further, in the slide unit mechanism in accordance with the present invention, the torsion springs may be disposed by two springs opposite each other in each receding portion.

By using such a configuration, it is possible to obtain the spring pressure same as in the conventional configuration with torsion springs of a small wire diameter. Therefore, the slide unit mechanism can be further reduced in thickness.

Further, in the slide unit mechanism in accordance with the present invention, portions for connection to the housing are formed substantially in four corners of the plate. By using such a structure, it is possible to end the sliding movement by abutting the connection portions and stopper portions of the sliding members upon each other.

Further, the joining portions of the sliding members that abut on the plate can be formed from a resin. Thus, the insert member made from a resin may be formed in the zone on the inner side of the sliding member portion folded to the rear surface side that is in friction contact with the plate.

A material with good sliding ability such as POM can be used as the resin forming the aforementioned member.

In the slide unit mechanism in accordance with the present invention, a hole for harness wiring can be provided in the protruding portion in the center of the rear surface of the plate. When the slide unit mechanism in accordance with the present invention is assembled in the monitor portion of a portable electronic device, it is possible to supply an electric current from a power source incorporated in the main body portion. Further, the slide unit mechanism in accordance with the present invention can use a torsion spring of a fine wire diameter. Therefore, a final product of small thickness can be formed.

An example of the slide unit mechanism in accordance with the present invention is explained below with reference to the appended drawings. However, the description below merely illustrates an example of the present invention and places no limitation on the present invention.

Embodiment 1

Figure 2:
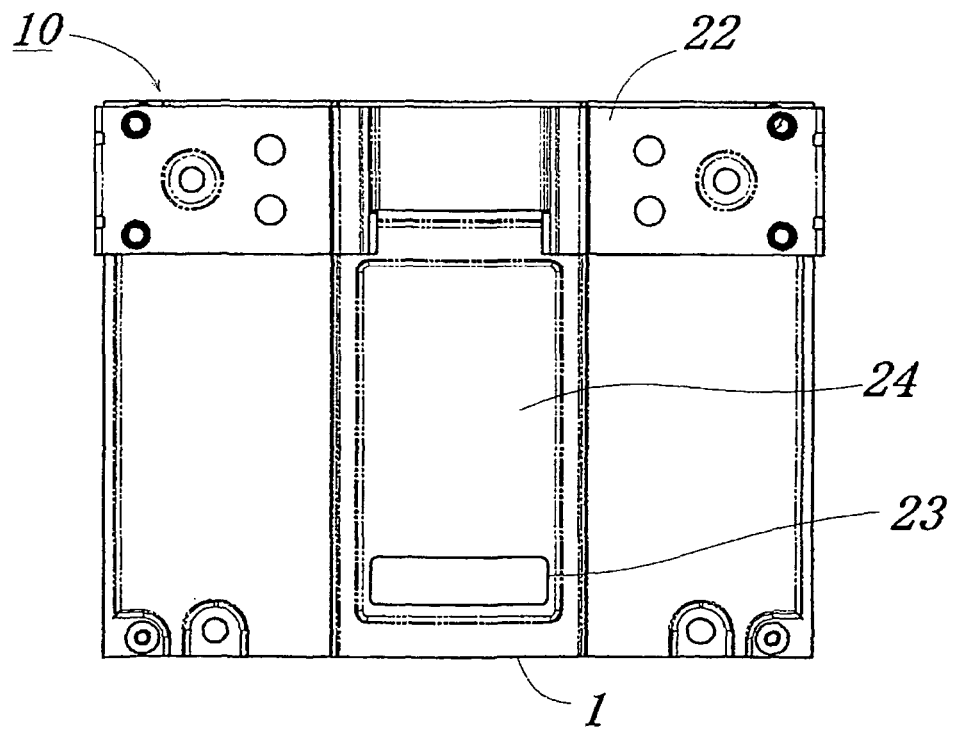

FIG. 1 and FIG. 2 are plan views illustrating a slide unit mechanism according to Embodiment 1. FIG. 1 and FIG. 2 show the structure of the slide unit mechanism 10 in which a housing (not shown in the figure) is closed. FIG. 1 is a plan view illustrating the slide unit mechanism according to Embodiment 1 that is viewed from the rear side, and FIG. 2 is a plan view showing the configuration on the front side.

As shown in FIG. 1, a plate 1 of a quadrangular shape in the plane view that is shown in FIG. 1 has a protruding portion A formed in the sliding direction in the center of the rear surface. Receding portions B are located at both sides of the protruding portion A.

Two sliding members 2 are joined to both ends of the plate 1. Further, as shown in FIG. 2, these two sliding members 2 are integrally linked to the front side of the plate 1 by a linking member 22. The linking member 22 is formed to have a width equal to the longitudinal width of the sliding member 2 in the sliding direction. The plate 1 and the linking member 22 having the sliders 2 are manufactured using SUS304.

As shown in FIG. 1, the sliding members 2 are folded to the rear surface side from the linking member 22, which is disposed on the front surface of the plate 1, and slidably joined to both ends of the plate 1.

Part of the central portion of the sliding member 2 on the folded rear surface side is extended to form a stopper portion 3.

As shown in FIG. 1, two torsion springs 4 and 5 are disposed in each of the left and right receding portions of the plate 1. The diameter of the torsion spring 4 or 5 is 0.4 mm. By combining such small-diameter right-wound torsion spring and left-wound torsion spring and disposing a total of four torsion springs, that is, two torsion springs each on the left and right side, it is possible to obtain a spring pressure equal to that in the conventional configuration. Further, since the equal spring pressure is generated on the left and right side, it is possible to obtain a high-durability slide unit mechanism in which uneven wear during sliding movement is prevented, sufficient spring force is obtained, and deterioration with time is small.

The torsion springs 4 and 5 on one side thereof are locked to substantially central portions, in the sliding direction, of the side surfaces of the central protruding portion in the plate 1. In Embodiment 1, ribs 6 are formed from the central protruding portion to be substantially in plane therewith, two support rods (not shown in the figure) are provided vertically by laser welding at the rear surface of the ribs 6, and one end of each torsion spring 4 or 5 is wound about and locked to the support rods. Laser welding is selected so that the welded portion could not be seen from the front side.

The other end of each torsion spring 4 or 5 is rotatably locked to the stopper portion 3 of the sliding member 2. Locking to the stopper portion 3 is performed by disposing two support rods on the rear surface of the sliding member 2 and winding the end portions of the torsion springs 4, 5 on the support rods.

The wound portions of the torsion springs 4 and 5 are formed by plane spiral winding, as shown in the figure. By forming the wound portion of the torsion spring in a plane spiral shape, as mentioned hereinabove, rather than by winding in the vertical direction makes it possible to obtain a thinner slide unit mechanism.

Further, in the slide unit mechanism 10 according to the present embodiment, as shown in FIG. 2, an opening 23 is formed below the central protruding portion of the plate 1. A recess 24 is formed above the opening 23 in the sliding direction. An electric current can be supplied from the opening 23 to a circuit (not shown in the figure) disposed in the recess 24.

Figure 3:
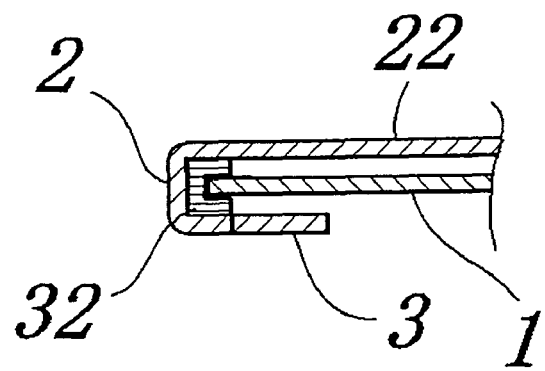

As shown in FIG. 3, the sliding member 2 has an insert member 32 formed from a polyacetal in a joining portion that abuts on the plate 1. By providing such an insert member 32, it is possible to reduce the friction in the joint portion of the plate 1 and the sliding member 2 during sliding movement and also ensure electric insulation in the joint portion.

Figure 4:
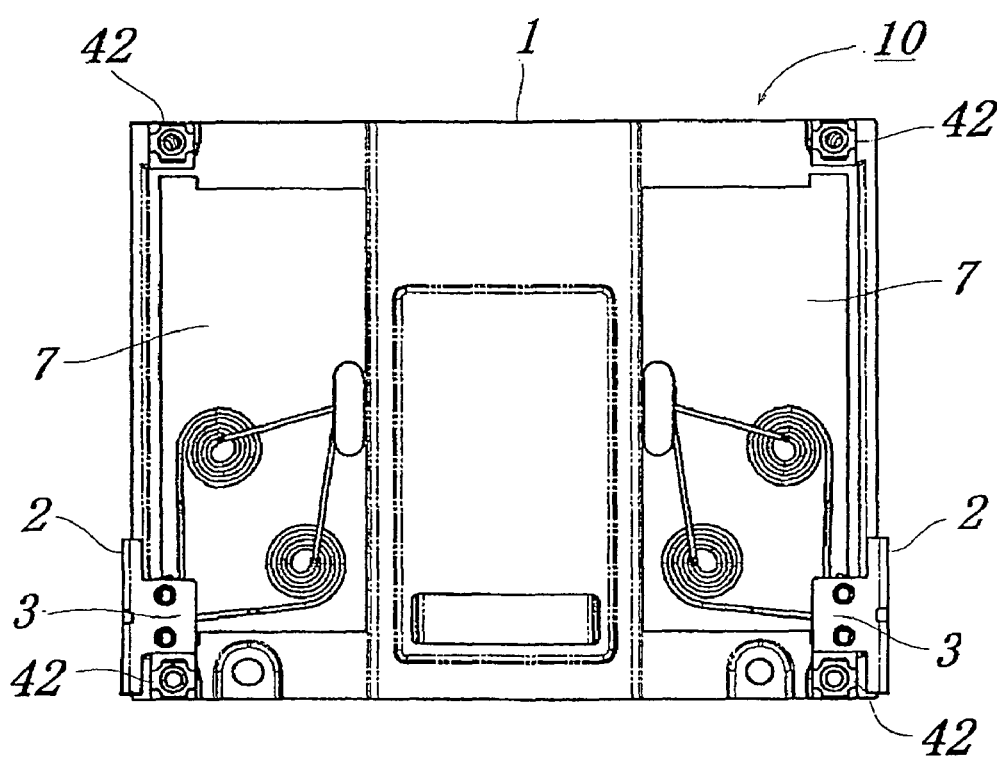
Figure 5:
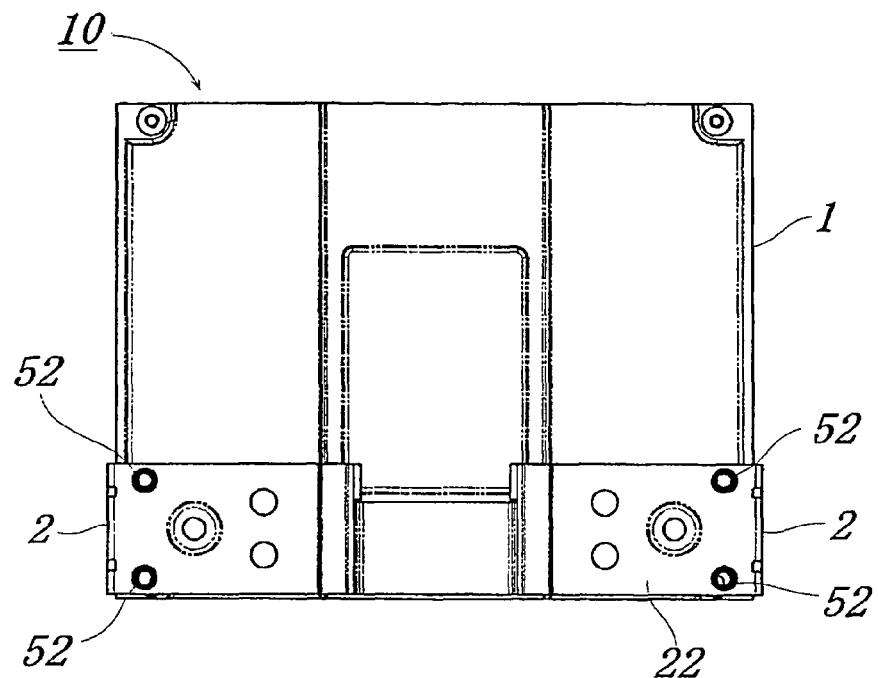

FIG. 4 and FIG. 5 are plan views illustrating the slide unit mechanism according to Embodiment 1. FIG. 4 and FIG. 5 show the structure of the slide unit mechanism 10 in which a housing (not shown in the figure) is opened by the sliding movement. Thus, FIG. 4 is a plan view illustrating the slide unit mechanism according to Embodiment 1 that is viewed from the rear side, and FIG. 5 is a plan view showing the configuration on the front side. Since FIG. 4 and FIG. 5 illustrate the same mechanism as shown in FIG. 1 and FIG. 2, some of reference numerals are omitted.

As shown in FIG. 4, the plate 1 of a quadrangular shape in the plane view that is used in Embodiment 1 has a protruding portion formed in the sliding direction in the center of the rear surface. On both sides of the protruding portion, the receding portion is located. Sheets 7 are attached to the receding portions. Such a configuration has a function of preventing electric conduction caused by contact of the plate 1 and the torsion springs 4 and 5 and also a function of increasing the ability of torsion springs to slide over the plate 1. The sheets 7 are formed from polyethylene terephthalate. Other materials may be also used for the sheets 7, provided that these other materials have insulating properties.

Two sliding members 2 are joined to both ends of the plate 1. Further, as shown in FIG. 5, these two sliding members 2 are integrally linked to the front side of the plate 1 by the linking member 22. The linking member 22 is formed to have a width equal to the longitudinal width of the sliding member 2 in the sliding direction. Nuts 52 for linking to the housing are formed in four corners of the linking member 22.

As shown in FIG. 4, part of the central portion of the sliding member 2 on the folded rear surface side is extended to form the stopper portion 3.

The state of the slide unit mechanism 10 according to the present embodiment that is shown in FIG. 4 and FIG. 5 is obtained by sliding movement from the closed state shown in FIG. 1 and FIG. 2.

As shown in FIG. 4, connection members 42 for connection to the housing (not shown in the figure) are formed substantially in the four corners of the plate. The connection member 42 has a substantially quadrangular shape, and a nut for connection to the housing is located in the central portion thereof subjected to tapping.

Under the spring force of the torsion springs 4 and 5, the sliding member 2 slidingly moves downward. The connection members 42 then abut on the stopper portions 3 of the sliding members 2 and the sliding can be stopped.

Embodiment 2

Figure 6:
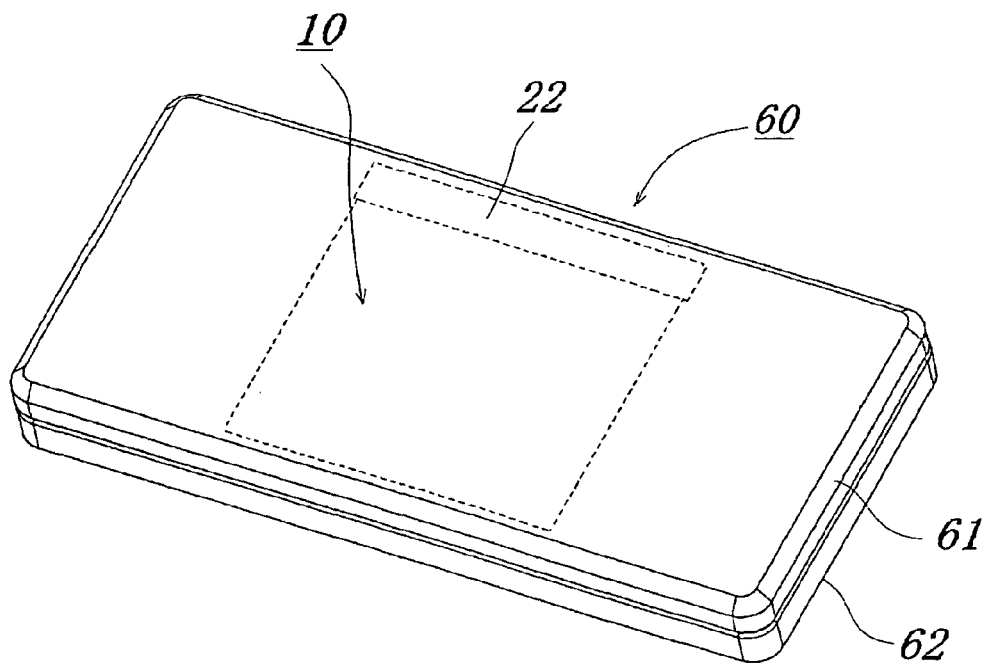
Figure 7:
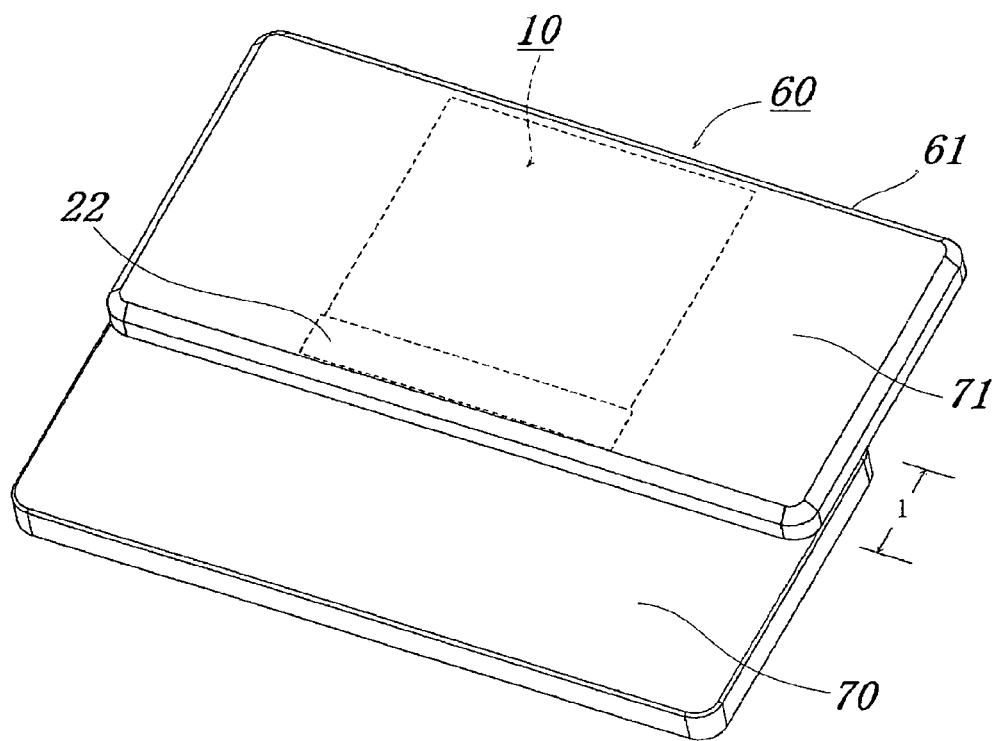

FIG. 6 and FIG. 7 are perspective drawings illustrating an example of a thin portable electronic device incorporating the slide unit mechanism 10 according to Embodiment 1. FIG. 6 shows the state in which the slide unit is closed, and FIG. 7 shows the state in which the slide unit is open. Components identical to those shown in FIG. 1 to FIG. 4 are assigned with same reference numerals.

As shown in FIG. 6, in a portable electronic device 60 according to the present embodiment, the plate 1 of the slide unit mechanism 10 is fixedly attached to a first housing (monitor portion) 61. The linking member 22 of the slide unit mechanism 10 is fixedly attached to a second housing (main body section) 62. The slide unit mechanism 10 is incorporated so as to be capable of sliding in the lateral direction of the housing.

In the portable electronic device 60 according to the present embodiment, the monitor portion 61 has a width of 114 mm, a length of 54.5 mm, and a height of 6.6 mm, and the main body section 62 has a width of 114 mm, a length of 54.5 mm, and a height of 9.2 mm.

As shown in FIG. 7, in the slide unit mechanism 10 used in the present embodiment, the width of the linking member 22 can be designed at about 12.45 mm, and the length (l) of the superimposed section of the monitor portion 61 and the main body section 62 can be reduced with respect to that of the conventional product.

Therefore, the surface area of a front surface panel 70 of the main body section 62 is increased over that of the conventional product, and the degree of freedom in designing the position and dimensions of the operation buttons is therefore increased. The resultant effect is that operability is increased over that of the conventional product.

The slide unit mechanism 10 can be designed to a width of about 59.68 mm and a length of about 43.6 mm. Therefore, as shown in FIG. 7, a space 71 for disposing an antenna or the like can be provided in the monitor portion 61 to the left and right of the slide unit. For example, it is possible to dispose a comparatively large antenna that is suitable for rapid reception of large volumes of communication information, for example, of oneseg-adaptable type in cellular phones.

What is claimed is:

1. A slide unit mechanism having: a plate of a quadrangular shape in a plane view in which a protruding portion is formed in a sliding direction in the center of the rear surface and receding portions are formed in two locations respectively to the left and to the right of the protruding portion; two sliding members slidably joined to both ends of the plate; and a linking member that integrally links the two sliding members on the front surface side of the plate and has a width substantially equal to or less than a longitudinal width of the sliding member in the sliding direction, wherein the entire portion or a part of the rear surface portion of the folded sliding member, when folded to the rear surface, is extended to serve as stopper portions, a torsion spring is arranged in each of the left and right receding portions of the plate, one end of each torsion spring is locked to the substantially central portion, in the sliding direction, of the side surface of the protruding portion formed on the plate, the other end of each torsion spring is locked to the stopper portions of the sliding members, connection members for connection to a housing are formed at the approximately four corners of the plate, and sliding ends are formed when the connection members and the stopper portions of the sliding members abut on each other.

2. The slide unit mechanism according to claim 1, wherein the torsion springs are disposed by two opposite each other in each receding portion.

3. The slide unit mechanism according to claim 1, wherein at least the joining portions of the sliding members that abut on the plate are formed from a resin.

4. The slide unit mechanism according to claim 1, wherein the stopper portions are obtained by extending only the center of the folded portions of the sliding members.

5. The slide unit mechanism according to claim 1, wherein the slide unit mechanism can be reduced in thickness by using the torsion springs formed in a flat spiral shape.

* * * * *